(12) United States Patent
Baechtle et al.

(10) Patent No.: US 8,997,614 B2
(45) Date of Patent: Apr. 7, 2015

(54) METHOD AND DEVICE FOR SEPARATING PRODUCTS

(71) Applicant: Albert Handtmann Maschinenfabrik GmbH & Co. KG, Biberach (DE)

(72) Inventors: Manfred Baechtle, Schemmerhofen (DE); Wolfgang Braig, Laupheim (DE); Siegfried Reutter, Eberhardzell (DE); Bernd Romer, Offingen (DE); Klaus Schmid, Riedlingen (DE); Daniel Teufel, Schemmerhofen (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 156 days.

(21) Appl. No.: 13/754,396

(22) Filed: Jan. 30, 2013

(65) Prior Publication Data

US 2013/0205961 A1    Aug. 15, 2013

(30) Foreign Application Priority Data

Feb. 14, 2012    (EP) .................................. 12155389

(51) Int. Cl.
*B26D 1/56* (2006.01)
*B26D 7/06* (2006.01)
*B26D 7/18* (2006.01)
*A22C 17/00* (2006.01)
*B26D 1/22* (2006.01)
*B26D 1/60* (2006.01)
(Continued)

(52) U.S. Cl.
CPC ................ *B26D 1/56* (2013.01); *B26D 7/0625* (2013.01); *B26D 7/18* (2013.01); *A22C 17/0006* (2013.01); *B26D 1/06* (2013.01); *B26D 1/12* (2013.01); *B26D 1/22* (2013.01); *B26D 1/46* (2013.01); *B26D 1/547* (2013.01); *B26D 1/60* (2013.01); *B26D 5/00* (2013.01); *B26D 5/14* (2013.01); *B26D 7/32* (2013.01); *B26D 2001/0066* (2013.01)

(58) Field of Classification Search
USPC .............. 99/537; 83/651, 385, 298, 312, 313, 83/260, 112, 109, 110, 318–320
See application file for complete search history.

(56) References Cited

U.S. PATENT DOCUMENTS 3,213,731 A * 10/1965 Renard ........................... 83/174
4,009,628 A * 3/1977 Kato ............................... 83/294
(Continued)

FOREIGN PATENT DOCUMENTS

EP    0429711 A1    6/1991
EP    1767096 B1    3/2007
(Continued)

OTHER PUBLICATIONS

European Search Report for EP 12 15 5389, dated Jun. 18, 2012.

*Primary Examiner* — Sean Michalski
(74) *Attorney, Agent, or Firm* — Marshall, Gerstein & Borun LLP

(57) ABSTRACT

A method and a device for separating food products, including to permit a straight cut at high cycle rates, the food product is conveyed by a conveying device in the direction of transport. The food product is cut through, where a cutting element is moved in the direction of transport and transverse to the direction of transport, wherein the motion of the cutting element transverse to the direction of transport is controlled independently of its motion in the direction of transport and the food product does not rest on the cutting area on the conveying means.

25 Claims, 6 Drawing Sheets

(51) Int. Cl.
*B26D 5/00* (2006.01)
*B26D 5/14* (2006.01)
*B26D 7/32* (2006.01)
B26D 1/06 (2006.01)
B26D 1/12 (2006.01)
B26D 1/46 (2006.01)
B26D 1/547 (2006.01)
B26D 1/00 (2006.01)

(56) References Cited

U.S. PATENT DOCUMENTS

| | | | | |
|---|---|---|---|---|
| 4,030,393 A | * | 6/1977 | Steiner | 83/318 |
| 4,572,044 A | * | 2/1986 | Antonissen | 83/42 |
| 5,299,480 A | * | 4/1994 | Harris et al. | 83/27 |
| 5,522,292 A | * | 6/1996 | Biagiotti | 83/38 |
| 5,647,259 A | * | 7/1997 | Biagiotti | 83/458 |
| 6,032,561 A | * | 3/2000 | Lonn et al. | 83/318 |
| 6,056,682 A | * | 5/2000 | Belanger et al. | 493/340 |
| 6,326,039 B1 | * | 12/2001 | Schiffmann et al. | 426/238 |
| 6,508,153 B1 | * | 1/2003 | Lumberg et al. | 83/318 |
| 6,923,101 B2 | * | 8/2005 | Culpepper et al. | 83/75.5 |
| 7,861,630 B2 | * | 1/2011 | Sorensen et al. | 83/42 |
| 8,261,646 B2 | * | 9/2012 | De Matteis | 83/651 |
| 8,387,499 B2 | * | 3/2013 | Westfall et al. | 83/35 |
| 8,776,549 B2 | * | 7/2014 | Lang | 65/97 |
| 2009/0238662 A1 | | 9/2009 | Duquette | |
| 2010/0011928 A1 | * | 1/2010 | Lee et al. | 83/109 |
| 2013/0000454 A1 | * | 1/2013 | Miller | 83/37 |
| 2013/0205961 A1 | * | 8/2013 | Baechtle et al. | 83/26 |
| 2014/0318339 A1 | * | 10/2014 | Briel et al. | 83/109 |

FOREIGN PATENT DOCUMENTS

| | | |
|---|---|---|
| FR | 1462606 A | 2/1967 |
| GB | 2377362 A | 1/2003 |
| WO | WO-0013864 A1 | 3/2000 |

* cited by examiner

METHOD AND DEVICE FOR SEPARATING PRODUCTS

CROSS-REFERENCE TO RELATED APPLICATION

The present application claims the benefit of priority of European Application No. 12155389.5, filed Feb. 14, 2012. The entire text of the priority application is incorporated herein by reference in its entirety.

FIELD OF THE DISCLOSURE

The disclosure relates to a method for separating food products and a device for performing the method.

BACKGROUND

The separation of food products without casings is often accomplished on conveying devices, in particular conveying belts, which are disposed downstream of a filling machine or a filling flow divider. In the process, the food products are supplied to the cutting element in one or more paths.

Different cutting methods are already known. To obtain a straight cut, the conveying belt is often stopped while the length is being cut through. However, the stopping times are detrimental as the product flow must be interrupted at each cutting operation to produce a straight cut.

There are also machines where the product flow is not stopped for this reason and the separating element moves through the length as quickly as possible. The higher the product to be separated, the more "oblique" is the cut as the product always moves horizontally and it is not possible to make the vertical motion of the knife infinitely small. Such products are at least in some cases rejected by the consumers for optical reasons.

It is already known from EP 1 767 096 B1 that the knife is moved along in synchronism with the length. In this case, it is disposed on an orbit where the horizontal and vertical motions depend on each other and cannot be controlled independently. So, the disadvantage here is that the vertical cutting speed depends on the horizontal speed of the product flow. This means in turn that the vertical cutting speed cannot be sufficiently fast. However, only then can a fibrous or tacky product be cleanly cut through. The tacky products tend to adhere to each other when they are transported further. A further disadvantage is that the length is squeezed off on the conveying belt when it moves along. This means that the length cannot be completely cut through as the cutting operation takes place above the belt surface.

SUMMARY OF THE DISCLOSURE

Starting from this situation, it is one aspect of the present disclosure to provide a method and a device which permit a straight and clean cut at high cycle rates and thus permit an optically attractive product with exact weight precision.

According to the present disclosure, the food product is transported in the direction of transport by a conveying device. The direction of transport indicates the direction into which the food products are conveyed. The food products are cut through by a cutting element, the cutting element being preferably moved both in the direction of transport T, that means together with the food product, and through the food product, that means e.g. transversely to the direction of transport. The motion of the cutting element is controlled into a first direction and, independent of this motion, into a second direction. Thus, an exact previously determined cutting pattern can be adjusted.

Here, the longitudinal axis of the food product is preferably in a plane which is spanned by the direction vectors of the two directions of motion. A deviation, i.e. an angle between the longitudinal axis of the food product and the aforementioned plane, of up to 10° is acceptable. Here, the first direction vector either coincides with the longitudinal axis of the food product or maximally forms an angle of 10° with the latter or with the support, respectively.

Preferably, the motion of the cutting element through the food product is effected independently of its motion into the direction of transport T, e.g. transversely or at an angle of 0° to 45° to the direction of transport or to the longitudinal axis of the food product, respectively. Thus, the cutting element can move through the food product e.g. transversely to the direction of transport at any speed although it moves along with the food product. By the possibility of independently moving the cutting element in the direction of transport and at an angle to the direction of transport, the motion of the cutting element can be exactly adapted to certain process conditions whereby a straight cut can be always produced. By a very quick cutting motion being possible independent of the food product speed, even fibrous and tacky products can be cleanly cut through.

Since the food product does not rest on the conveying means in the cutting area, the cutting element can move completely through the food product beyond the outer surfaces or the outer contour of the product. Thus, a clean straight cut is produced and the product is prevented from being squeezed. By the food product being freely guided in the cutting area, one obtains space for the motion of the cutting element such that the cutting element can be moved in the cutting area not only through the food e.g. transversely to the direction of transport, but also in the direction of transport with the food product. Cutting area is the area where the cutting element completely cuts through the food product and can thus be in particular moved beyond an adjacent support surface. Exactly in this cutting area where the food product is freely supported, sufficient space for the motion of the cutting element is now provided.

The disclosure permits high performance as the product flow does not have to be stopped and started again at each cutting operation. A continuous process is possible. One obtains a better weight precision of the portions and an improved product appearance.

During the cutting process, the cutting element is controlled such that it moves towards the food product and completely through the food product beyond the outer surface of the food product while it moves along with the food in the direction of transport T. Since the cutting element also moves along in the direction of transport while it is moving through the food, the relative motion between the conveying device and the cutting element can be minimized, so that a straight cut can be produced in a simple manner. Preferably, the speed of the cutting element corresponds to the speed of the conveying device.

The cutting element is preferably controlled such that it is moved out of the food product after said food product has been completely cut through and in the process moves faster in the direction of transport than the food product which is moved towards the cutting element, such that the cutting element drives away from the food product in the direction of transport. Thus, the product is prevented from adhering to the cutting element. The separated product which is behind the cutting element in the direction of transport can then be moved faster in the direction of transport T than the cutting element. Advantageously, the conveying device has two spaced conveying means between which the cutting area is located, where, when the cutting element returns transversely to the direction of transport after it has completely cut through the product, the following applies:

$$V_1 < V_2,$$

where, seen in the direction of transport T, $V_1$ is the transport speed of the first conveying means and $V_2$ is the transport speed of the second conveying means. If the speed of the second conveying means is higher than that of the first conveying means and the cutting area is located between the conveying means, it is possible to form a gap between the separated portions. This is particularly advantageous for tacky products as these can no longer adhere to each other after they have been cut off.

It is particularly advantageous if $V_1 < V_{cutting\ element} < V_2$, where $V_{cutting\ element}$ is the speed of the cutting element in the direction of transport. With the above mentioned speed ratio, one can on the one hand produce a gap between the separated food product as described above, and the cutting element can moreover move away from the food product and be removed from the product in a gap between the food product without mass adhering to the cutting element.

It is also possible that, for example with the aid of at least one pull-back belt, the gap is shifted along with the motion of the cutting element in the direction of transport. By this, the gap between the belts can be kept very small and it is possible for it to be only insignificantly larger than the width of the edge of the cutting element.

Advantageously, the cutting element, in particular a cutting knife, is moved towards a counter edge. It is advantageous for the counter edge to be moved along with the motion of the cutting element in the direction of transport, at least if the cutting element and the counter edge hit each other. Thus, the counter edge can be kept small and moreover exact cutting is possible.

Advantageously, the closed path, i.e. the course of motion of the cutting element, can be adjusted continuously variably. This means that the trajectory can be adjusted for different transport speeds, sausage calibers, etc., so that no retrofitting measures are required in case of product changes. The closed path is then lying in a plane which is spanned by the direction vectors of the independent motions or the drive axes. It is particularly advantageous if also the speed of the cutting element is varied in the direction of transport within a cutting cycle, i.e. on the closed path, so that, for example, during the motion of the cutting element through the food product, the relative speed between the food product and the cutting element is 0 if possible, but in the return motion of the cutting element, the path speed of the cutting element is increased to quickly move the cutting element away from the food product.

Advantageously, the food product is a product from the following group: food product without casing, length of minced meat, sausage length, coextruded sausage length. A device according to the present disclosure comprises a conveying device for transporting the food product in the direction of transport T, a cutting device with a cutting element for cutting through the food product and with a motion mechanism via which the cutting element can be moved both in the direction of transport and through the food. The motion mechanism is designed such that the motion of the cutting element can be independently controlled along two drive axes in two directions, and in particular that the motion of the cutting element through the food can be independently controlled by the motion of the cutting element in the direction of transport. The device is designed such that the food product does not rest on the conveying means in a cutting area in which the cutting element completely cuts through the food product.

So, no support surface for the food product is provided in the cutting area, or the food product is guided such that the food product is spaced apart from the support surface in the cutting area. It is thus ensured that the product can be completely cut through by the cutting element and is not squeezed off.

Advantageously, the support surface of the conveying device comprises a gap for the cutting area for this purpose. The gap can be obtained e.g. as follows:

The conveying device can comprise two spaced conveying means, in particular circulating conveying means, for example two conveying belts or a circulating conveying means and a supply tube, the cutting area being provided in the gap between the conveying means. However, the conveying means can also comprise a circulating conveying belt which is deflected in the cutting area such that the gap is formed in the support surface of the conveying belt.

It is also possible for the conveying device to comprise a circulating conveying means, the cutting area being then provided upstream of the conveying means, i.e. upstream of the support surface. In this way, too, the cutting element can be moved completely through and beyond the outer contour of the product.

Advantageously, the cutting device comprises a counter edge for the cutting element which can be moved in particular into and opposite to the direction of transport.

If the conveying device comprises two spaced conveying means it is advantageous for the conveying means to be controllable independently and for the speed of the two conveying means to be adjustable independently. Thus, for example a gap between separated food portions can be produced by the following conveying means running faster.

In case of two conveying means, it is advantageous for at least one conveying means to be embodied as pull-back belt as then the gap between the conveying means can be shifted.

According to a preferred embodiment, the conveying device comprises a supply tube as a first conveying means via which the food product is supplied to a second conveying means, the cutting area being situated, seen in the direction of transport, behind the tube, such that the product flow does not rest on the conveying device in the cutting area. In the process, the tube can be oriented either to be essentially parallel to the support surface of the conveying device, or else at a certain angle within a range of 0 to 90°, in particular perpendicular. If the product flow is then supplied from above, it can also be cut. In this case, the cutting element is installed to be rotated e.g. by 90°, so that it can then cut horizontally.

The tube can be extendable like a telescope, in particular if it essentially extends in parallel to the support surface of the conveying device. Thus, the tube can telescopically extend at a speed which essentially corresponds to the speed of the conveying device. The cutting element can then cut through the product along the tube edge.

According to a further preferred embodiment, the supply tube can comprise a beveled end, and the cutting element can be moved obliquely along the edge which then functions as counter support. If the cutting element moves along with the food product in the direction of transport, the beveled tube offers the advantage of providing a "counter edge" across the complete height of the cut and of producing a straight cut. The speed of the food product and the cutting element is then correspondingly adjusted. It is also possible for the food product to be cut off obliquely along the tube's edge.

BRIEF DESCRIPTION OF THE DRAWINGS

The disclosure will be illustrated below with reference to the following figures.

DETAILED DESCRIPTION OF THE PREFERRED EMBODIMENT

Figure 1:
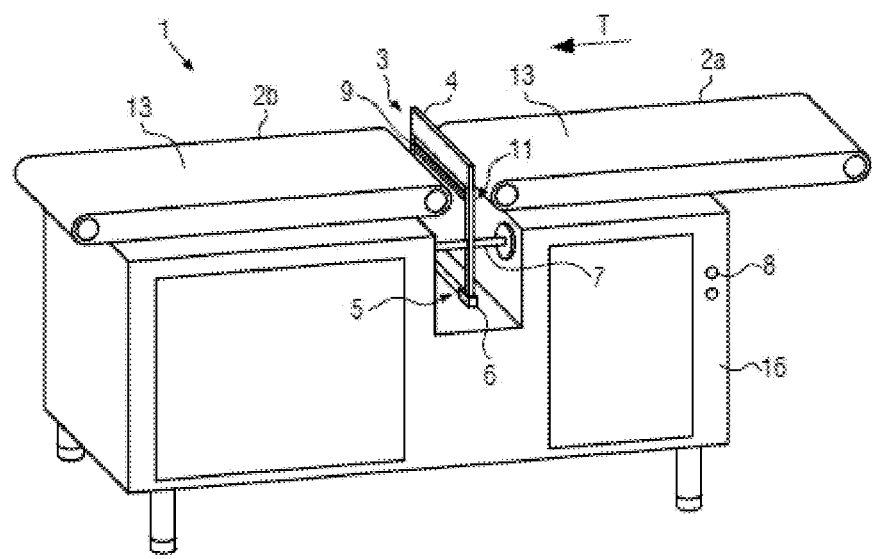
FIG. 1 shows, in a perspective representation, an embodiment of a device for separating food according to the present disclosure.

FIG. 1 shows, in a schematic representation, a possible embodiment of the present disclosure. The device 1 for separating food products 12 comprises a conveying device 2a, b which here comprises two circulating conveying means in the form of two circulating conveying belts 2a, 2b. The conveying belts each have a support surface 13 for the food product. The two conveying belts 2a, b are attached on a machine housing 16. The two conveying means 2a, b each have a separate, not represented drive in the form of a drive motor and can be controlled independently of each other. The speeds can also be adjusted independently. It is also possible to only provide one drive, e.g. a motor, and to adjust the speeds of the conveying means via corresponding gears with different transmission ratios independently of each other. The conveying means can also be controlled in a clocked manner.

The conveying means 2a, b are spaced apart such that a gap 11 is formed between the conveying means. The distance or the gap between the conveying means should be kept as small as possible and is 40 mm at most, measured from the facing front ends. The dimension a of the gap, however, must be greater than or equal to the thickness of a cutting element 4 such that the cutting element 4 can move through the gap 11. The cutting element 4 is part of a cutting device 3 for cutting through the food product. The cutting element 4 is preferably a cutting knife, a cutting wire, a rotating cutting knife, a circulating cutting wire, or else a reciprocating knife.

The cutting device 3 furthermore comprises a motion mechanism 5 for the cutting element 4 via which the cutting element 4 can be moved both in the direction of transport T—here horizontally—and at an angle to the direction of transport T—here vertically. For this, the motion mechanism has a first axis 6, here a vertical axis, and a second axis 7, here a horizontal axis, the axes being in this embodiment perpendicular with respect to each other. If, for example, the support surface 13 of the conveying means is inclined, the motion mechanism can also be inclined such that e.g. the second axis 7 is parallel to the support surface 13.

The motion mechanism 5 is designed such that the motion of the cutting element 4 through the food product, in this case transverse to the direction of transport or the longitudinal axis L of the food product, respectively, can be controlled independently of the motion of the cutting element 4 in the direction of transport. Thus, the cutting element can move through the food product transversely to the direction of transport at any speed, although it moves along with the food product. By the possibility of moving the cutting element independently in the direction of transport and through the food product, the motion of the cutting element can be exactly adapted to certain process conditions, whereby a straight cut can always be produced. By a very quick cutting motion being possible independent of the food product speed, even fibrous and tacky products can be cleanly cut through.

Figure 2:
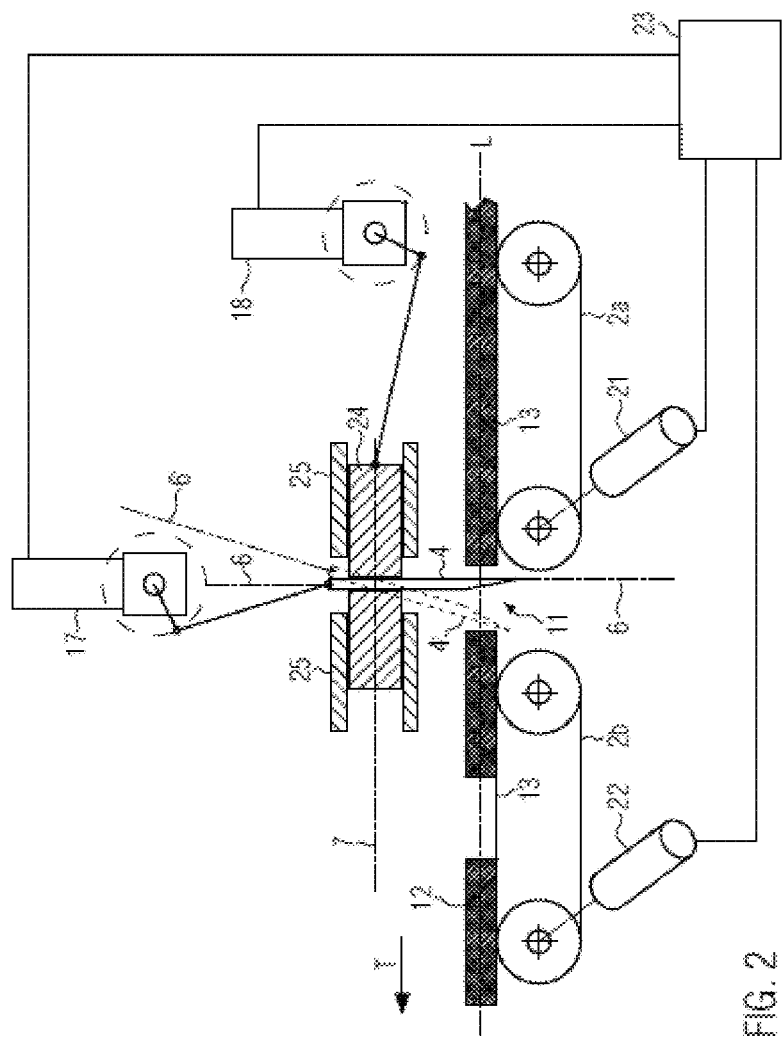
FIG. 2 shows, in a perspective representation, a motion mechanism for moving the cutting element.

FIG. 2 shows a possible embodiment of a motion mechanism 5 in greater detail. The motion mechanism has a first drive unit 17 for moving the cutting element 4 over the first axis 6 and a second drive unit 18 for moving the cutting element 4 over the second axis 7. The two drive units here each comprise a separate drive motor. However, a common drive motor with decoupled gears is also possible.

With the aid of the first drive unit 17, the cutting element 4 is moved along the first cutting axis 6. In the process, the knife is guided in a guide 24. The drive axis 6 here has a vertical orientation, i.e. perpendicular to the longitudinal axis L of the food product and perpendicular to the support surface 13 of the e.g. second conveying device 2b, respectively. The cutting element 4 can thus be moved towards the food product 12 and completely cut through it. The second drive unit 18 moves the cutting element 4 in the first drive direction 7 along the first drive axis 7. In this embodiment, for example the guide 24 is moved along the drive axis 7. Here, the guide 24 is located in a further guide 25. The motors of the first and second drive units 17, 18 are controlled by a control 23. The motor or the motors 21, 22 of the conveying devices 2a, 2b are also correspondingly controlled by the control 23.

The longitudinal axis L is located in a plane which is spanned by the direction vectors of the two directions of motion or by the two drive axes 6 and 7, respectively. A deviation, i.e. an angle between the longitudinal axis L of the food product 12 and the aforementioned plane of up to 45° is acceptable. Advantageously, the second drive axis 7 is oriented in parallel to the longitudinal axis L. An angle between the drive axis 7 and the longitudinal axis L of 45° is also still acceptable for a perfect function.

If, for example, the direction of transport, i.e. the support surface 13, is inclined towards a horizontal line 5, the motion device 5 can be correspondingly inclined.

With the motion device 5, a closed path of the cutting element can be freely adjusted continuously variably, the path being located in the aforementioned plane which is spanned by the drive axes 6 and 7. The speed on the closed path can also be arbitrarily adjusted via the control of the motors 17, 18.

For realizing an oblique cut, the drive axis 6 can be inclined, for example, as represented in a dashed line, as is shown by the axis 6' in FIG. 2. The axis 6' is here oriented at an angle of up to 45° to the longitudinal axis L. The guide 24 here also has a correspondingly designed recess. Thus, an oblique motion through the food product 12 can then also be effected independent of a motion in the direction of transport T. This is in particular important if one cuts, for example, along an oblique tube edge, as will be illustrated later in connection with FIG. 9. An oblique cut can also be obtained by adapting the speeds of the food product and the cutting element with respect to each other.

The cutting device 3 is designed and disposed in the device such that the cutting element 4 can completely move through the food product beyond the outer surface or the outer contour of the food product, respectively. This means that the cutting element 4 can move deeper with the lower cutting edge than the support surface 13, such that a complete cut through the product is possible. So, the lower cutting edge can be located deeper than the support surface 13 in the cutting area when the cutting element 4 completely cuts through the food product.

By the cutting area 10 being disposed in the gap 11 between the two conveying belts 2a, b, there is space for a motion of the cutting element 4 not only in one direction, e.g. transverse to the direction of transport T, but also for a motion of the cutting element 4 together with the food product. Thus, a clean straight cut is produced and a squeezing of the product is prevented.

Figure 3:
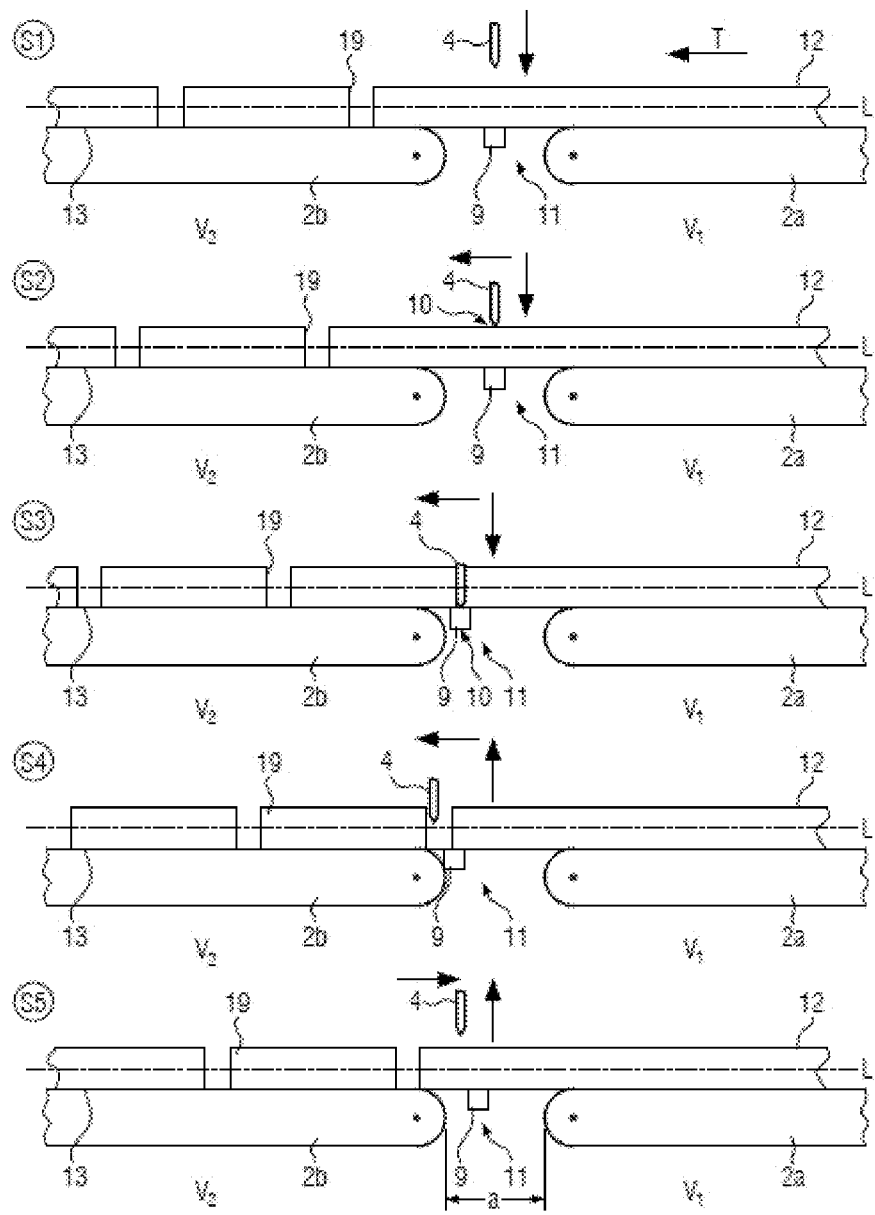
FIG. 3 shows, in a schematic representation, steps S1 to S5 of a cutting operation.

Advantageously, the cutting device 3 can also have a counter edge 9, as can be in particular taken from FIGS. 2 and 3. When the sausage length is completely cut through, the cutting edge of the cutting element strikes the counter edge. Advantageously, the counter edge can move along with the motion of the cutting element in the direction of transport, at least if the cutting element and the counter edge hit each other. It is possible for the counter edge to move along synchronously with the motion of the cutting element. For this, a corresponding motion mechanism is provided, as can be taken from FIG. 2. The motion mechanism can be coupled with the motion mechanism 5, so that no separate drive for the counter edge is necessary.

The functions of the conveying means 2a, b and the cutting device can be controlled by the control 23 as mentioned. The control can also be part of a main control of a filling machine.

FIG. 3 shows the essential steps of a possible embodiment of the method according to the disclosure with the device shown in FIG. 1. In FIG. 3, the distance a between the conveying belts 2a, b, is shown excessively large for a simplified representation. The food product flow 12 is supplied to the conveying device 2, for example via a supply tube of a filling machine or a filling flow divider by means of a conveyor or pump. The product flow can be supplied in one or several paths. The trajectory and speed of the cutting element 4 are determined ahead and stored in a controlling system. The trajectory and speed of the cutting element 4 was adapted to the current process conditions, such as belt speed, product type, product caliber, etc.

In step S1 of a motion cycle, the cutting element 4 is shown in a first position spaced apart from the food product 12. Advantageously, the conveying means 2a, b move at the same speeds, i.e. $V_1 = V_2$ ($V_1$ corresponds to the transport speed in the direction of transport T of the first conveying means 2a, and $V_2$ corresponds to the speed in the direction of transport of the second conveying means 2b). The motion device 5 now moves the cutting element 4 towards the product 12 transversely to the direction of transport T.

In step S2, the cutting element 4 starts to cut through the food product 12. Now at the latest, the motion mechanism 5 starts to additionally move the cutting element 4 in the direction of transport T. Advantageously, the speed of the cutting element 4 in the direction of transport T, $V_{cutting\ element}$ is identical to the speed $V_1$ of the conveying means 2a. At least, however, the relative speed between the cutting element and the first conveying means 2a should be as small as possible to produce a straight cut. In step S2, $V_2 = V_1$ can also apply.

The cutting element 4 then moves further through the product 12 and simultaneously in the direction of transport T together with the product, as can be seen in step S3, until it completely cuts through the food product 12 and moves through the bottom side of the product until it strikes e.g. a counter edge 9. The counter edge 9 can move along with the cutting element 4 in the direction of transport T at least in the cutting area 10 when the cutting element and the counter edge strike each other. A synchronous motion with the cutting element 4 is also possible.

If the length according to step 3 has been completely cut through, the speed $V_2$ of the conveying belt 2b can be increased, so that $V_2 > V_1$. This can produce a gap 19 between the separated portions as becomes clear from step S4. The cutting element 4 can still have a higher speed $V_{cutting\ element}$ than V1 even when the cutter is pulled out in step S4, where:

$$V_1 < V_{cutting\ element} < V_2.$$

preferably applies for the retraction of the cutting element. The cutting element 4 then moves again, as can be taken from step S5, further upwards away from the product length and opposite to the direction of transport T to the starting position shown in step S1, where the conditions described in connection with step 1 apply again. The variations of speeds $V_1$, $V_{cutting\ element}$, and $V_2$ correspond to a particularly advantageous embodiment. The present disclosure, however, also functions with fixed speeds which are not varied. It is also possible that e.g. in step 5, the cutting element is exclusively moved transversely to the direction of transport and subsequently opposite to the direction of transport—that means no superimposed motion takes place. It is essential with the disclosure that the cutting element moves along with the product, at least while it engages the sausage length and completely cuts through the length (step S2/S3).

Figure 4:
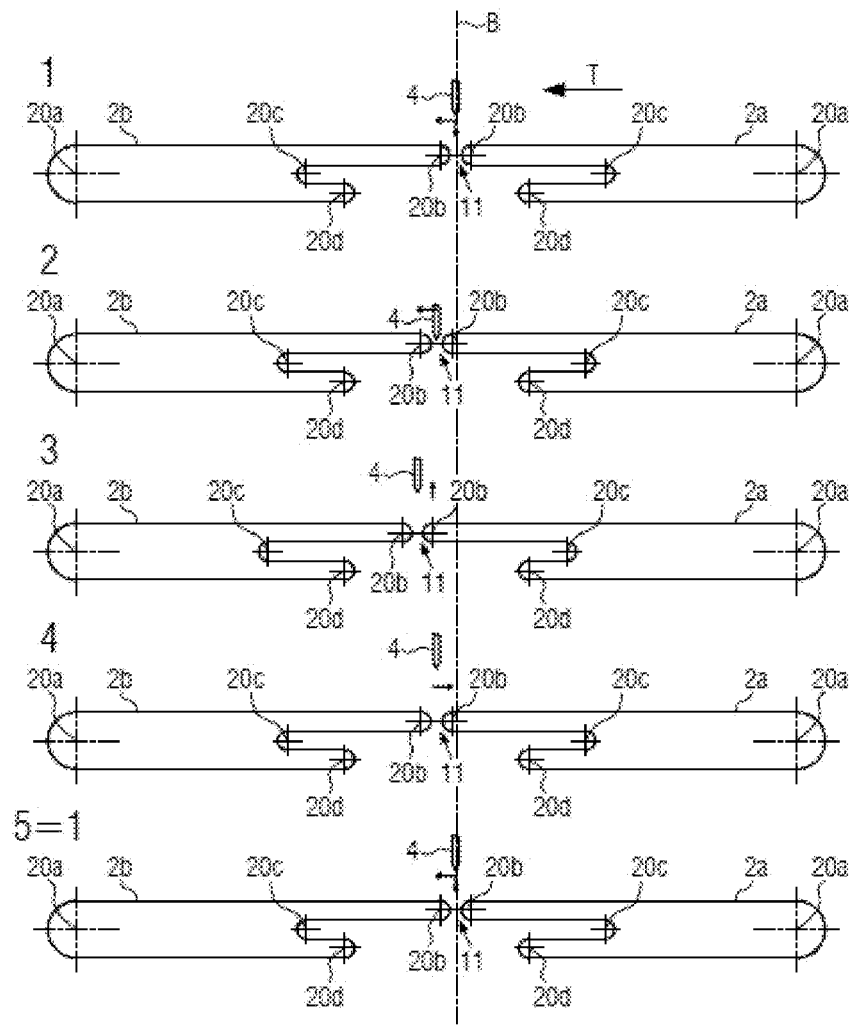
FIG. 4 roughly schematically shows individual steps of a cutting operation with a pull-back belt system.

In FIG. 3, the distance a was drawn excessively large for illustration purposes. Of course, the distance should be as small as possible, so that the product is sufficiently well guided on the support surface 13. FIG. 4 shows a preferred embodiment with a pull-back belt system by means of which the distance can be minimized.

With the aid of a pull-back belt, the gap 11 between the two conveying means 2a, b can be moved in the direction of transport and back. Therefore, the distance a can be kept so small that only the cutting element finds place in the gap 11. Advantageously, the gap 11 is shifted synchronously with the motion of the cutting element 4 in the direction of transport T.

With a pull-back belt system, the belt is deflected around a roller 20a e.g. at the side facing away from the cutting device, and over several rollers at the opposite side. The axes of the rollers 20b and 20c are disposed in the direction of transport to be adjustable. The adjustment of the axes can be effected, for example, via a powered or pneumatically actuated linear drive. The rollers 20d and 20a are fixed. If now the axes of the rollers 20c and 20b of both conveying means are each shifted together in the direction of transport, the gap 11 correspondingly moves in the direction of transport, as becomes clear when conditions 1 and 2 are compared. In condition 1, the knife is moved e.g. downwards for cutting through the food product 12, i.e. transverse to the direction of transport T and in the direction of transport T with the product, as was explained above. The gap 11 is shifted along with the motion of the cutting element 4 in the direction of transport, preferably synchronously, as described above. In this embodiment, in condition 2, where the cutting element is located at the lower dead center and the food product 12 has been completely cut through, the cutting element is moved still further in the direction of transport T, the gap 11 moving along by the axes 20b, c of the conveying devices 2a, b being correspondingly shifted along.

In condition 3, the cutting element 4 is now moved upwards. Since here the cutting element 4 does not perform any further motion in the direction of transport T, the gap 11 remains in its position. As shows condition 4, the cutting element 4 is brought into its original position against the direction of transport again, i.e. to condition 1. It would also have been possible to superimpose the motions of conditions 3 and 4. When the cutting element 4 is returned, the gap 11 is also shifted again against the direction of transport by shifting the axes 20b, c against the direction of transport to condition 5 which corresponds to the starting position in condition 1. If the pull-back belt system is embodied with a knife edge, this system can simultaneously serve as counter edge. Knife edge means here e.g. a deflection roller 20b of a very small diameter. The knife edge is then connected with the pull-back belt system or its movable axes such that the knife edge or counter edge moves corresponding to the motion of the cutting element.

In connection with FIG. 4, the motion of the gap 11 corresponding to the motion of the cutting element 4 was shown. The settings of the speeds $V_1$, $V_2$, $V_{cutting\ element}$, however, can also be designed as illustrated in connection with FIG. 3.

Figure 5:
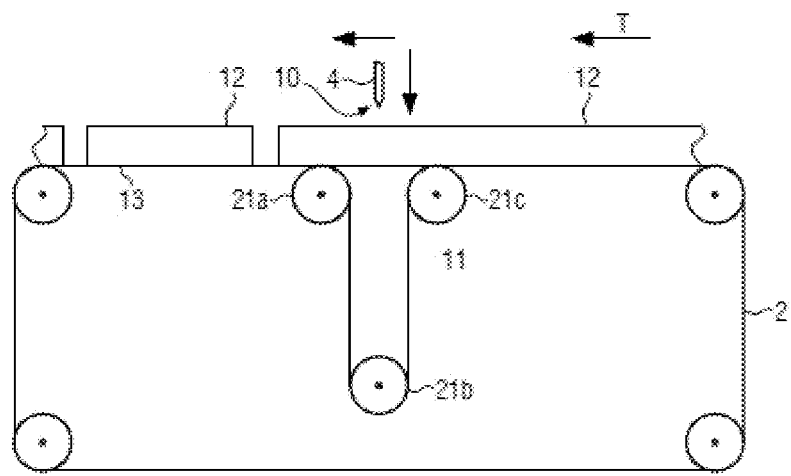
FIG. 5 roughly schematically shows a further embodiment of the present disclosure with a deflected belt.

FIG. 5 shows another possible embodiment of the present disclosure for producing a gap in the support surface 13 of a conveying belt of the conveying device 2. Here, a conveying belt is deflected via corresponding rollers 21a, 21b, 21c such that a gap 11 is generated in the support surface such that the cutting element 4 can completely cut through the product length beyond the bottom side. If one designs the axes 21a, 21b, 21c corresponding to the pull-back belt system illustrated in connection with FIG. 4 to be shifted in the direction of transport T and against the direction of transport T, the gap 11 can be moved along with the motion of the cutting element 4, as illustrated above. For the rest, this embodiment corresponds to the above represented embodiments.

Figure 6:
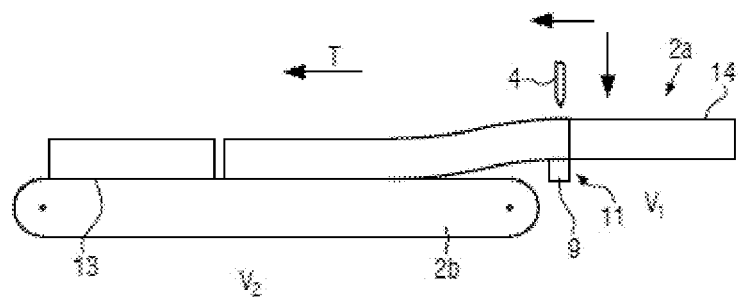
FIG. 6 roughly schematically shows a further embodiment of the present disclosure with a cutting area upstream of the conveying device.

FIG. 6 shows a further possible embodiment where a supply tube 14 or several supply tubes 14 arranged in parallel with respect to each other are provided and eject a product length onto the conveying means 2b. Here, the supply tube 14 can also be seen as first conveying means 2a, and the conveying means 2b as second conveying means. The ejecting end of the supply tube 14 is, seen in the direction of transport T, disposed upstream of the second conveying means 2b, such that the food product does not rest on the conveying means in the cutting area, that means here on the support surface 13, and that the product length can be completely cut through. In this embodiment, too, the motion of the cutting element 4 is transverse or at an angle to the direction of transport T independent of its motion in the direction of transport, where here, too, the cutting element 4 moves along with the product length when it cuts through the latter as described above. As in the embodiment described in connection with FIG. 3, the speed $V_2$ of the conveying means 2b can, after the product length has been completely cut through, be higher than the supply speed via the tube 14, where the conveying speed of the product through the tube 14 would then correspond to the first transport speed $V_1$ of the first conveying means 2a in FIG. 3. Thus, with this embodiment, too, a gap 19 can be generated between the divided portions. Here, too, in the return motion of the cutting knife 4 out of the product length, $V_1 < V_{cutting\ element} < V_2$ can apply, the speed $V_1$ being here the transport speed of the conveying means 14 which supplies the product length. The speed of the product length via the supply tube 14 is, for example, adjustable via a not represented conveyor or vane pump.

Figure 7:
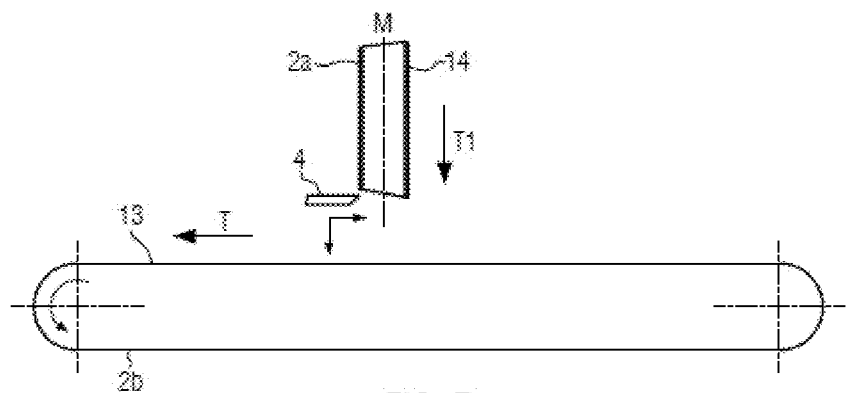
FIG. 7 roughly schematically shows a further embodiment of the present disclosure where the product flow is supplied via a tube.

FIG. 7 corresponds to the embodiment shown in FIG. 6, where here, however, the supply tube 14 supplies the food product from above onto the conveying device 2. In this case, the motion mechanism and the cutting element are installed rotated by 90°, or if the tube 14 does not extend by 90° to the conveyor belt 2, rotated by the angle that corresponds to an angle between the central axis M of the tube and the support surface 13. Here, too, several supply tubes 14 can be arranged one behind the other (into the image plane). The outlet of the tube is beveled. This means that the plane in which the closed end edge of the tube is lying is not inclined perpendicularly to the central axis M of the tube but at an angle of 0° to −45°.

Here, too, the cutting element 4 moves both in the direction of transport T1 of the product 12 (here perpendicularly to the support surface 13 or along the central axis L, respectively) along with the product length, such that there is no relative speed between the cutting element 4 and the product flow, or this speed difference is minimized. Moreover, the cutting element 4 moves, like in the above embodiments, transversely to this direction of transport T1 of the product to completely cut through the product. While the product is being cut through, it does not rest on a support surface, so that the cutting element 4 can completely cut through the product, i.e. beyond the side contour of the product. If the cutting element moves along with the food product in the direction of transport, the beveled tube offers the advantage that a "counter edge" is available across the complete height of the cut, and a straight cut can be produced. The speed of the food product and of the cutting element is then adjusted correspondingly.

If a beveled tube end is provided, it is also possible that the cutting element 4 is not moved perpendicularly to the direction of transport T1 or to the central axis M, but at an angle which preferably corresponds to the angle which the plane in which the closed end edge of the tube is located forms together with the central axis M (see also FIG. 2). It is then possible for the cutting element 4 to move along the beveled tube end through the food product 12, whereby an oblique cut can be produced. The tube end then functions as counter support for the cutting element 4. The cutting element can touch the tube edge or have a distance of up to 2 mm to the tube edge. An oblique cut can also be obtained by adapting the speeds of the food product and the cutting element with respect to each other.

Figure 8:
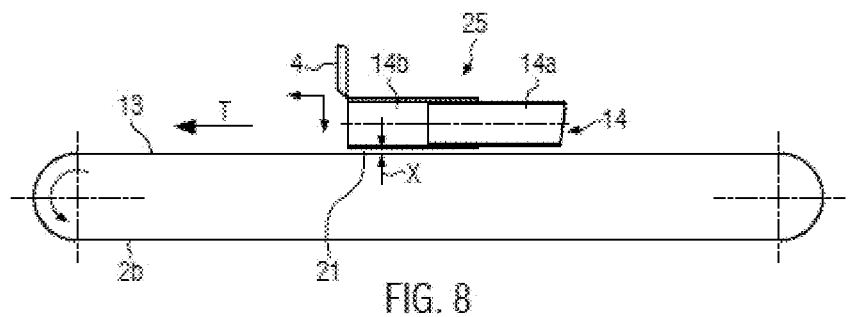
FIG. 8 roughly schematically shows a further embodiment according to the present disclosure with a supply tube that can be telescopically elongated.

FIG. 8 shows another embodiment of the present disclosure which corresponds to the embodiment described in connection with FIGS. 6 and 7, here, however, the supply tube 14 not being arranged upstream of the conveying device 2 but above the conveying device 2 at a distance x to the surface. The tube comprises a first tube section 14a which is stationary and a telescopically movable second tube section 14b which can move in the direction of transport T and back. Thus, the tube can be extended like a telescope at a speed which essentially corresponds to the speed of the conveying means 2b corresponding to the motion of the cutting element 4 in the direction of transport T. The cutting element 4 can then separate the product along the tube edge 21. Thus, a straight cut along the tube edge can be realized. By the tube being spaced apart from the support surface 13 of the conveying belt by a distance x, the food product does not rest on the support surface 13 when it is separated, so that it can be completely cut through. The distance x is within a range of 1 mm to 10 mm. By the telescopic supply tube being extended or shortened synchronously to the motion of the cutting element 4, a particularly straight cut along the tube edge can be realized.

The telescopic design of the supply tube 14 can also be realized corresponding to the embodiment shown in FIG. 6 and FIG. 7 and is also possible, as illustrated in connection with FIG. 7, with a beveled tube edge to generate an oblique or straight cut.

If one cuts along the tube edge, one does not need a counter edge, i.e. the tube edge corresponds to the counter edge.

Figure 9:
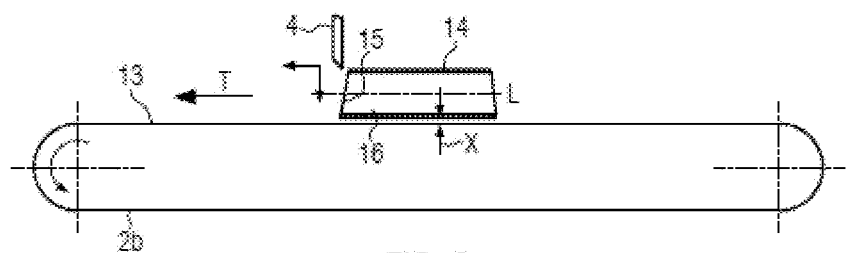
FIG. 9 roughly schematically shows a further embodiment according to the present disclosure.

FIG. 9 shows another embodiment according to the present disclosure. FIG. 9 corresponds to the embodiment shown in connection with FIG. 7, where here the tube is rotated by 90°, that means it is oriented parallel to the support surface 13 of the conveying means 2b. Here, too, the cutting element 4 can be either moved perpendicularly to the longitudinal axis L of the product 12 through the product 12 for cutting through the product length 12 as explained above or else obliquely along the beveled tube end, for example. The distance X is here also within a range of 1 mm to 10 mm. The oblique cut can be generated by the knife or the drive axis 6' also being inclined, as explained in connection with FIG. 2, or by the trajectory of the cutting knife 4 being adjusted by the drive units 17 and 18 such that a correspondingly oblique cutting pattern is formed. The speed is also adjusted correspondingly. An oblique cut of the product can be generated if the linear motion of the product, i.e. the speed in the direction of transport, is unlike the linear motion of the cutting element, e.g. wire or cutter, or the unit is inclined, or the knife is installed obliquely.

In the embodiments shown in connection with FIGS. 6-9, the tubes have an annular cross-section. The tubes can also have e.g. a cornered or oval cross-section.

A cutting element with knives on either side is also possible (top and bottom). If the cutting motion is initiated by rotation, a pulling cut is also conceivable.

The invention claimed is:

1. A method of separating food products, comprising:
   transporting the food product in a direction of transport with a conveying device,
   cutting through the food product, wherein a cutting element is moved through the food product and moved along with the food product in the direction of transport, wherein
   the motion of the cutting element is controlled into a first direction and, independent of this motion, into a second direction, and after the food product has been completely cut through, the cutting element is moved out of the food product and moves faster in the direction of transport than the food product which is moved towards the cutting element, such that the cutting element drives away from the food product in the direction of transport, and
   the food product does not rest on a conveying device in the cutting area.

2. The method according to claim 1, wherein the motion of the cutting element through the food product is controlled independently of its motion in the direction of transport.

3. The method according to claim 1, wherein during the separation operation, the cutting element is controlled such that the cutting element moves towards the food product and completely through the food product beyond the outer surface of the food product while the cutting element moves along with the food in the direction of transport.

4. The method according to claim 1, wherein the conveying device comprises two spaced conveying means between which the cutting area is located, where, when the cutting element moves out of the food product after the food product has been completely cut through, the following applies:

$v_1 < v_2,$ where, seen in the direction of transport, $V_1$ is the transport speed of the first conveying means and $V_2$ is the transport speed of the second conveying means.

5. The method according to claim 1, wherein the conveying device comprises two spaced, conveying means, wherein in the gap between the conveying means the cutting area is provided, and the gap is shifted, during a separation cycle, together with the motion of the cutting element.

6. The method according to claim 1, wherein the cutting element is moved towards a counter edge and the counter edge.

7. The method according to claim 1, a closed path of the cutting element can be freely adjusted continuously variably.

8. The method according to claim 1, wherein the food product is one of the following group: minced meat length, sausage length, coextruded sausage length, food without casing.

9. A device for performing the method according to claim 1, comprising:
   a transport device for transporting the food product in the direction of transport,
   a cutting device with a cutting element for cutting through the food product,
   a motion mechanism by which the cutting element can be moved through the food product and moved along with the food product in the direction of transport,
   the motion mechanism being such that the motion of the cutting element can be independently controlled along two drive axes in two directions and after the food product has been completely cut through, the cutting element being movable out of the food product and being movable faster in the direction of transport than the food product which is moved towards the cutting element, such that the cutting element drives away from the food product in the direction of transport, and
   the device being such that in a cutting area in which the cutting element completely cuts through the food product, the food product does not rest on the transport device.

10. The device according to claim 9, wherein the motion mechanism being designed such that the motion of the cutting element through the food product can be controlled independently of the motion of the cutting element in the direction of transport.

11. The device according to claim 9, wherein, in the cutting area, no support surface for the food product is provided, or the food product is guided such that in the cutting area, the food product is spaced apart from the support surface.

12. The device according to claim 9, and a support surface of the conveying device comprises a gap in which the cutting area is provided, wherein either
   a) the conveying device comprises two spaced conveying means, wherein the cutting area is provided in the gap between the conveying means, or
   b) the conveying means comprises a circulating conveying belt which is deflected in the cutting area such that the gap is formed in the support surface of the conveying belt.

13. The device according to claim 9, wherein the conveying device comprises a circulating conveying means, wherein the cutting area is upstream of the conveying means.

14. The device according to claim 9, wherein the cutting device comprises a counter edge for the cutting element which can be moved into and against the direction of transport.

15. The device according to claim 12, wherein in case a), the conveying means can be controlled independently of each other, and the speed of the two conveying means can be adjusted independently of each other.

16. The device according to claim 12, wherein in case a), at least one conveying means is designed as pull-back belt.

17. The device according to claim 9, wherein the conveying device comprises a supply tube as first conveying means by which the food product is supplied to a second conveying means and the cutting area is located in the direction of transport downstream of the tube, such that the product flow does not rest on the conveying device in the cutting area.

18. The device according to claim 9, wherein the tube can be extended like a telescope.

19. The device according to claim 17, wherein the tube comprises a beveled end.

20. The method according to claim 4, and further wherein $V_{cutting\ element}$ is the speed of the cutting element in the direction of transport.

21. The method according to claim 5, wherein the two spaced conveying means are circulating.

22. The method according to claim 6, and further wherein the counter edge is moved along with the motion of the cutting element in the direction of transport, at least when the cutting element and the counter edge strike one another.

23. The method according to claim 7, and further wherein the speed of the cutting element is variably adjusted on the closed path in the direction of transport.

24. The device according to claim 12, wherein the two spaced conveying means are circulating.

25. The device according to claim 18, wherein the extension of the tube is with the motion of the cutting element.

\* \* \* \* \*